United States Patent
Nakajima

(10) Patent No.: US 8,567,281 B2
(45) Date of Patent: *Oct. 29, 2013

(54) ROTATING DEVICE AND ROBOT ARM DEVICE

(75) Inventor: Takeshi Nakajima, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/418,061

(22) Filed: Mar. 12, 2012

(65) Prior Publication Data

US 2012/0186382 A1    Jul. 26, 2012

Related U.S. Application Data

(63) Continuation of application No. 12/392,576, filed on Feb. 25, 2009, now Pat. No. 8,166,844.

(30) Foreign Application Priority Data

Feb. 29, 2008  (JP) ................................. 2008-049296
Dec. 22, 2008  (JP) ................................. 2008-325104

(51) Int. Cl.
*B25J 18/00*  (2006.01)
*H01F 21/06*  (2006.01)
*H04B 5/00*  (2006.01)

(52) U.S. Cl.
USPC ........ 74/490.01; 336/120; 336/320; 455/41.1

(58) Field of Classification Search
USPC ............ 74/490.01, 490.03, 490.04; 455/41.1, 455/41.2
See application file for complete search history.

(56) References Cited

U.S. PATENT DOCUMENTS

| | | | |
|---|---|---|---|
| 2,422,303 A | 6/1947 | Jacob et al. | |
| 3,441,886 A | 4/1969 | Tveter | |
| 3,974,017 A | 8/1976 | Tanigawa et al. | |
| 4,754,180 A | 6/1988 | Kiedrowski | |
| 5,375,480 A * | 12/1994 | Nihei et al. | 74/490.02 |
| 5,498,911 A | 3/1996 | Bossler et al. | |
| 5,564,312 A * | 10/1996 | Brunman et al. | 74/490.02 |
| 5,572,178 A | 11/1996 | Becker et al. | |
| 6,512,437 B2 | 1/2003 | Jin et al. | |
| 6,556,165 B2 * | 4/2003 | Fukushima et al. | 342/75 |

(Continued)

FOREIGN PATENT DOCUMENTS

| | | |
|---|---|---|
| JP | A-8-69933 | 3/1996 |
| JP | A-8-222459 | 8/1996 |

(Continued)

OTHER PUBLICATIONS

May 11, 2011 Office Action issued in U.S. Appl. No. 12/392,576.

(Continued)

*Primary Examiner* — Troy Chambers
*Assistant Examiner* — Alexander Vu
(74) *Attorney, Agent, or Firm* — Oliff & Berridge PLC

(57) ABSTRACT

A rotating device includes a communication unit including a transmitting portion having a first ring-shaped coil, a first ring-shaped magnetic body covering the first ring-shaped coil and a first terminal connected to the first ring-shaped coil, and a receiving portion having a second ring-shaped coil, a second ring-shaped magnetic body covering the second ring-shaped coil and a second terminal connected to the second ring-shaped coil, and a bearing connecting a hollow fixed portion to a hollow rotating portion.

7 Claims, 10 Drawing Sheets

(56) References Cited

U.S. PATENT DOCUMENTS

| | | |
|---|---|---|
| 6,950,633 B2 | 9/2005 | Kojima et al. |
| 7,532,788 B2 | 5/2009 | Koitabashi |
| 7,663,462 B2 | 2/2010 | Makuth et al. |
| 8,166,844 B2 * | 5/2012 | Nakajima ............ 74/490.01 |
| 2003/0173936 A1 | 9/2003 | Sezgin et al. |
| 2006/0048364 A1 * | 3/2006 | Zhang et al. ......... 29/407.08 |
| 2012/0186382 A1 * | 7/2012 | Nakajima ............ 74/490.02 |

FOREIGN PATENT DOCUMENTS

| | | |
|---|---|---|
| JP | A-8-276392 | 10/1996 |
| JP | A-10-163048 | 6/1998 |
| JP | A-2000-216035 | 8/2000 |
| JP | A-2000-286138 | 10/2000 |
| JP | A-2002-25837 | 1/2002 |
| JP | A-2002-050529 | 2/2002 |
| JP | A-2002-280240 | 9/2002 |

OTHER PUBLICATIONS

Aug. 19, 2011 Final Office Action issued in U.S. Appl. No. 12/392,576.

Dec. 14, 2011 Notice of Allowance issued in U.S. Appl. No. 12/392,576.

* cited by examiner

ROTATING DEVICE AND ROBOT ARM DEVICE

This is a continuation of U.S. patent application Ser. No. 12/392,576 filed Feb. 25, 2009, which claims the benefit of Japanese Patent Application No. 2008-325104 filed Dec. 22, 2008 and Japanese Patent Application No. 2008-049296 filed Feb. 29, 2008. The disclosures of the prior applications are hereby incorporated by reference herein in their entirety.

BACKGROUND

1. Technical Field

The present invention relates to a rotating device and a robot arm device.

2. Related Art

In a rotating device including a rotating portion which rotates with respect to a fixed portion, a communication cable in which a signal is transmitted between a fixed side and a rotating side, a power cable to which power is supplied, a flexible pipe through which fluid such as air or liquid flows and the like pass in the vicinity of a rotation axis at which the fixed portion and the rotating portion are connected. In order to suppress a phenomenon in which these cables and flexible pipes expand and contract, or twist due to rotation operation, there is a case in which cables and flexible pipes are provided so as to pass through the inside of the fixed portion and the rotating portion. Or, for example, in the robot arm which deals with semiconductor products or food, there is a case in which cables and flexible pipes are provided so as to pass through the inside of the fixed portion and the rotating portion for avoiding generation of dust or dirt caused by cables or flexible pipes. Accordingly, many cables and flexile pipes are provided in the vicinity of the central axis of the rotation axis, which enlarges the size of the rotating device or sets a limit on a rotation angle.

For example, in JP-A-2002-280240 (Patent Document 1), a method is proposed, in which power is supplied by a transformer including coils at a fixed portion and a rotating portion respectively so as to sandwich a bearing, and transmitting communication of a signal is performed in a non-contact manner by a radio transmitter/receiver provided in the vicinity of the central axis of the bearing.

However, there is a case in which transmitting communication of a signal is performed in the non-contact manner as well as cables and flexible pipes to be connected between the fixed side and rotating side are provided so as to pass through the inside of the fixed portion and the rotating portion. In the method of Patent Document 1, since the radio transmitter/receiver as a communication means is provided in the vicinity of the central axis of the bearing, it is difficult to secure a spatial area passing through the inside of the rotation axis. Therefore, there is a problem that it is difficult to allow cables and flexible pipes to pass through the inside of the fixed portion and the rotating portion.

SUMMARY

An advantage of some aspects of the invention is to solve at least a part of the problem described above and the invention can be realized as the following embodiments or application examples.

Application Example 1

A rotating device includes a communication unit including a transmitting portion having a first ring-shaped coil, a first ring-shaped magnetic body covering the first ring-shaped coil and a first terminal connected to the first ring-shaped coil, and a receiving portion having a second ring-shaped coil, a second ring-shaped magnetic body covering the second ring-shaped coil and a second terminal connected to the second ring-shaped coil, and a bearing connecting a hollow fixed portion to a hollow rotating portion, which is capable of rotating with respect to the fixed portion, in which the first ring-shaped coil and the second ring-shaped coil are formed so as to be wound around a rotation axis of the bearing, the first ring-shaped magnetic body and the second ring-shaped magnetic body face each other with a gap formed in the direction of the rotation axis, and the communication unit is provided inside the fixed portion and the rotating portion.

According to the configuration, the first ring-shaped magnetic body covering the first ring-shaped coil and the second ring-shaped magnetic body covering the second ring-shaped coil face each other with the gap formed in the direction of the rotation axis. Therefore, even when the rotating portion rotates with respect to the fixed portion, communication is possible. Additionally, the communication unit is provided inside the fixed portion and the rotating portion. According to this, communication cables respectively connected to the transmitting portion and the receiving portion forming the communication unit can pass through the inside of the fixed portion and the rotating portion which are hollow.

Additionally, the first ring-shaped coil, the first ring-shaped magnetic body, the second ring-shaped coil and the second ring-shaped magnetic body have a ring shape around the rotating axis. According to this, cables, flexible pipes and the like can pass in the vicinity of respective rotation axes of the ring shape, therefore, they can pass through the inside of the fixed portion and the rotating portion.

Application Example 2

In the above rotating device, the gap in the direction of the rotation axis is provided in the vicinity of the bearing.

According to the configuration, when the rotating portion rotates with respect to the fixed portion, misalignment between surfaces on which the first ring-shaped magnetic body and the second ring-shaped magnetic body respectively rotate and a surface orthogonal to the rotation axis can be suppressed, therefore, the distance of the gap to be changed can be reduced. According to this, it is possible to suppress damage caused by contact between the first ring-shaped magnetic body and the second ring-shaped magnetic body as well as to suppress instability in communication between the first terminal and the second terminal.

Application Example 3

In the above rotating device, the gap in the direction of the rotation axis is provided so as to be aligned with the bearing.

According to the above, when the rotating portion rotates with respect to the fixed portion, misalignment between surfaces on which the first ring-shaped magnetic body and the second ring-shaped magnetic body respectively rotate and a surface orthogonal to the rotation axis can be further suppressed, therefore, the distance of the gap to be changed can be further reduced. According to this, it is possible to suppress damage caused by contact between the first ring-shaped magnetic body and the second ring-shaped magnetic body as well as to suppress instability in communication between the first terminal and the second terminal.

Application Example 4

In the above rotating device, the first ring-shaped magnetic body covers the first ring-shaped coil, which is the opposite side of the second ring-shaped coil, and the second ring-shaped magnetic body covers the second ring-shaped coil, which is the opposite side of the first ring-shaped coil.

According to the above, magnetic flux respectively generated by the first ring-shaped coil and the second ring-shaped coil flows in the first ring-shaped magnetic body and the second ring-shaped magnetic body respectively, therefore, it is possible to suppress instability in communication between the first terminal and the second terminal.

Application Example 5

In the above rotating device, first ring-shaped magnetic body covers the side of the rotation axis of the first ring-shaped coil, and the second ring-shaped magnetic body covers the side of the rotation axis of the second ring-shaped coil.

According to the above, magnetic flux respectively generated by the first ring-shaped coil and the second ring-shaped coil flows in the first ring-shaped magnetic body and the second ring-shaped magnetic body respectively, therefore, it is possible to suppress instability in communication between the first terminal and the second terminal.

Application Example 6

In the above rotating device, the first ring-shaped magnetic body covers the opposite side of the rotation axis of the first ring-shaped coil, and the second ring-shaped magnetic body covers the opposite side of the rotation axis of the second ring-shaped coil.

According to the above, magnetic flux leaking outside the first ring-shaped coil and the second ring-shaped coil can be reduced, therefore, it is possible to provide further another electromagnetic induction coupling portions including another first ring-shaped coil, another second ring-shaped coil, another first ring-shaped magnetic body and another second ring-shaped magnetic body outside the first ring-shaped coil and the second ring-shaped coil.

Application Example 7

A robot arm device including the above rotating device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments will be explained with reference to the drawings.

First Embodiment

Figure 1:
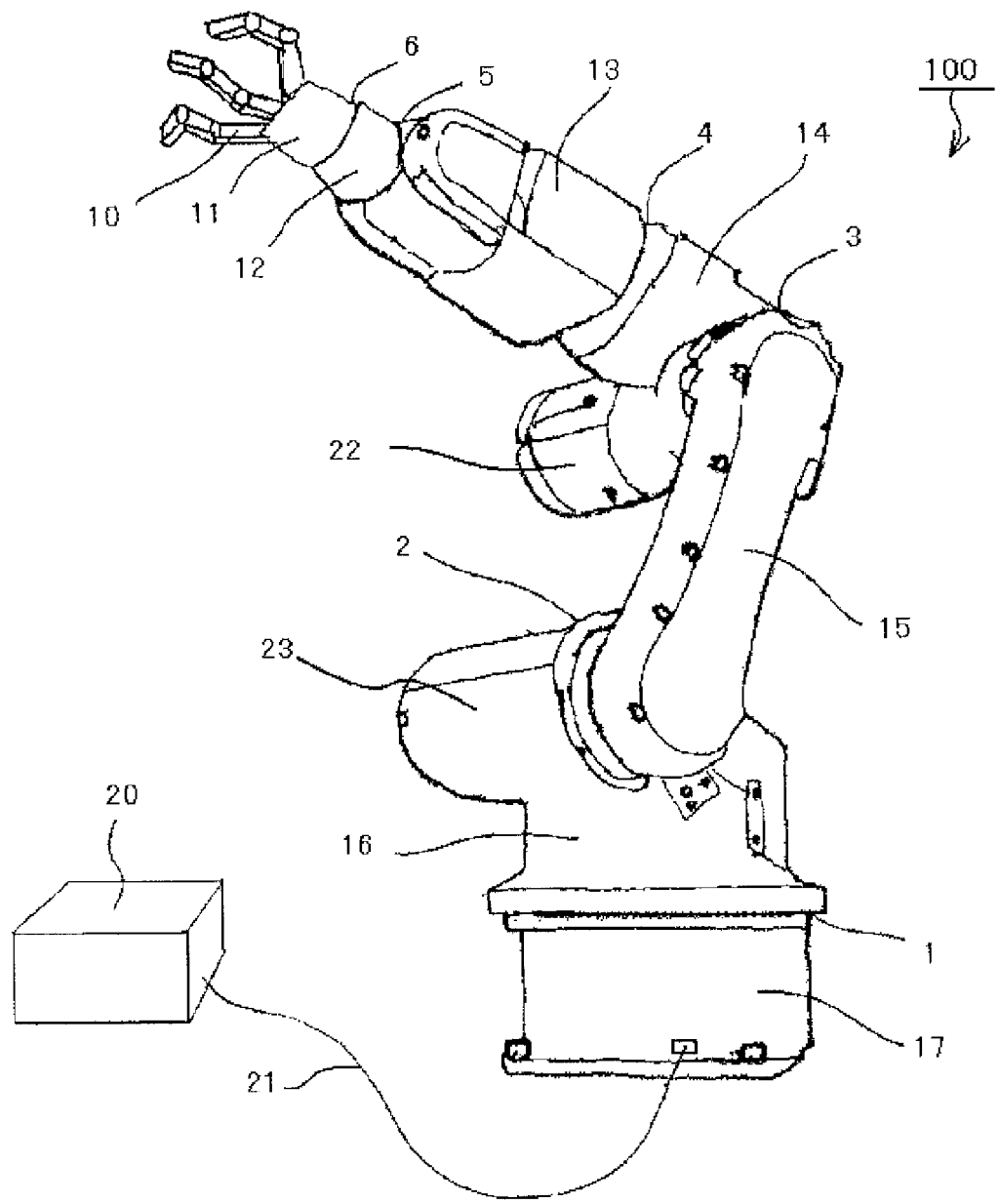
FIG. 1 is an external perspective view of a robot arm including a communication unit according to a first embodiment.

FIG. 1 is an external perspective view of a robot arm 100 including a communication unit according to a first embodiment. The robot arm 100 includes rotation axes 1 to 6. The robot arm 100 includes a rotating portion 16 which rotates about the rotation axis 1, taking a pedestal 17 as a fixed portion, an arm 15 which rotates about the rotation axis 2, taking the rotating portion 16 as a fixed portion, an arm 14 which rotates about the rotation axis 3, taking the arm 15 as a fixed portion, a rotating portion 13 which rotates about the rotation axis 4, taking the arm 14 as a fixed portion, a rotating portion 12 which rotates about the rotation axis 5, taking the rotating portion 13 as a fixed portion and a manipulator 11 which rotates about the rotation axis 6, taking the rotating portion 12 as a fixed portion.

The manipulator 11 attaches and removes an object by operating plural fingers 10. The manipulator 11 can be attached and removed at the rotating portion 12 as well as can be exchanged with another manipulator performing operation suitable for the work contents such as a processing process or an assembly process of a target object to be provided at the rotating portion 12.

A controller 20 is connected to the robot arm 100 by a communication cable 21, controlling rotating operations at the rotation axes 1 to 6 by controlling the driving of motors 22, 23 and not-shown motors.

Figure 2:
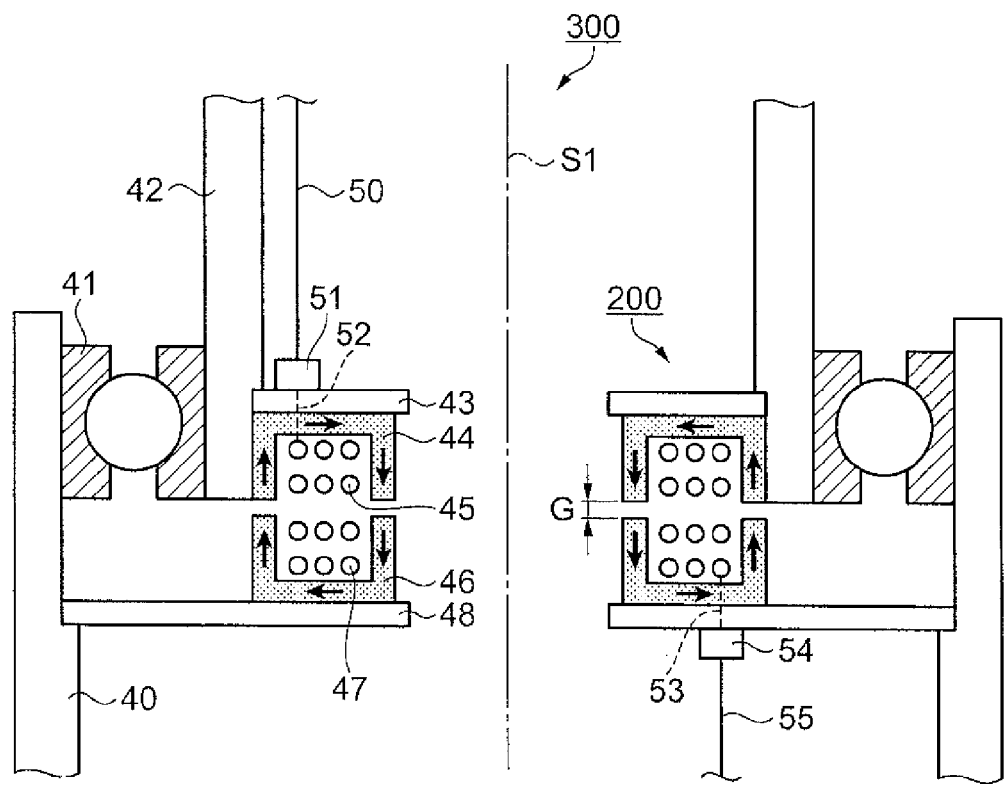
FIG. 2 is a cross-sectional view of a rotating device including a communication unit.

FIG. 2 is a cross-sectional view of a rotating device 300 including a communication unit 200 according to the first embodiment. The rotating device 300 including the communication unit 200 in FIG. 2 is provided at the rotation axis 1 to the rotation axis 6 of FIG. 1. For example, in the rotation axis 1, a fixed member 40 as a fixed portion forms part of the pedestal 17. A rotating member 42 as a rotating portion forms part of the rotating portion 16.

The fixed member 40 and the rotating member 42 have a hollow cylindrical shape having a cavity. The fixed member 40 is fitted to a bearing 41 which is a rolling bearing, and the rotating member 42 is fitted to the bearing 41. The rotating member 42 as the rotating portion rotates about a rotation axis S1 by the bearing 41, taking the fixed member 40 as the fixed portion.

Disk-shaped supporting members 43, 48 are respectively provided at inner peripheries of the rotating member 42 and the fixed member 40. The supporting members 43, 48 have a ring shape, which secures a spatial area passing through the rotation axis S1.

Figure 3:
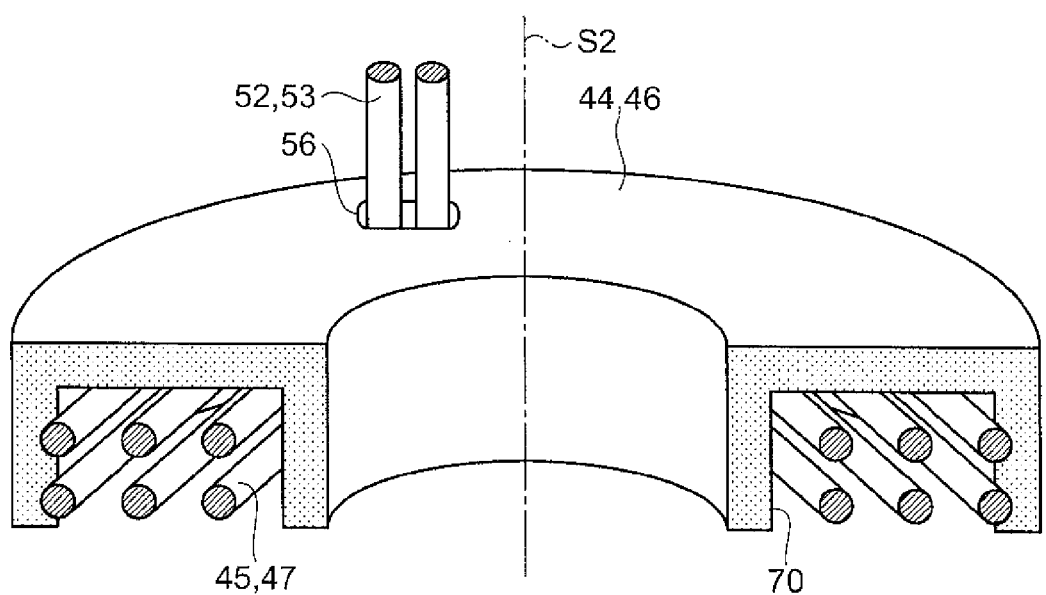
FIG. 3 is a cross-sectional perspective view of coils formed by winding magnetic bodies and lead wires.

FIG. 3 is a cross-sectional perspective view of a coil 45 and a coil 47 formed by winding magnetic bodies 44, 46 and lead wires with insulating film. The magnetic body 46 and the magnetic body 44 are made of magnetic material such as ferrite. The coils 45, 47 formed by winding lead wires such as copper are wound with respect to one central axis S2 are covered by a groove portion 70 of the magnetic bodies 44, 46, respectively. Ends of the coils 47, 45 are electrically connected to the lead wire with insulating film 53 and the lead wire with insulating film 52 through a magnetic-body piercing hole 56.

As shown in FIG. 2, the magnetic body 44 having the coil 45 is supported by the supporting member 43 in a state in which the open side of the groove portion 70 is directed to the lower side in the drawing. The magnetic body 46 having the coil 47 is supported by the supporting member 48 in a state in which the open side of the groove portion 70 is directed to the upper side in the drawing. Outer diameters of the magnetic bodies 44, 46 are the same and outer diameters of the coils 45, 47 are the same. The central axis S2 of the coils 45, 47 in FIG. 3 is provided so as to correspond to the rotation axis S1 in FIG. 2. The magnetic bodies 44, 46 are provided so that ring-shaped plane surfaces thereof face each other with a gap "G" therebetween.

A transmitter 54 connected to a communication cable 55 and the lead wire with insulating film 53 which pierces through the supporting member 48 and the magnetic body 46 is provided at the supporting member 48 in FIG. 2. The lead wire with insulating film 53 is electrically connected to the coil 47. A receiver 51 connected to a communication cable 50 and the lead wire with insulating film 52 which pierces through the supporting member 43 and the magnetic body 44 is provided at the supporting member 43. The lead wire with insulating film 52 is electrically connected to the coil 45.

Figure 4:
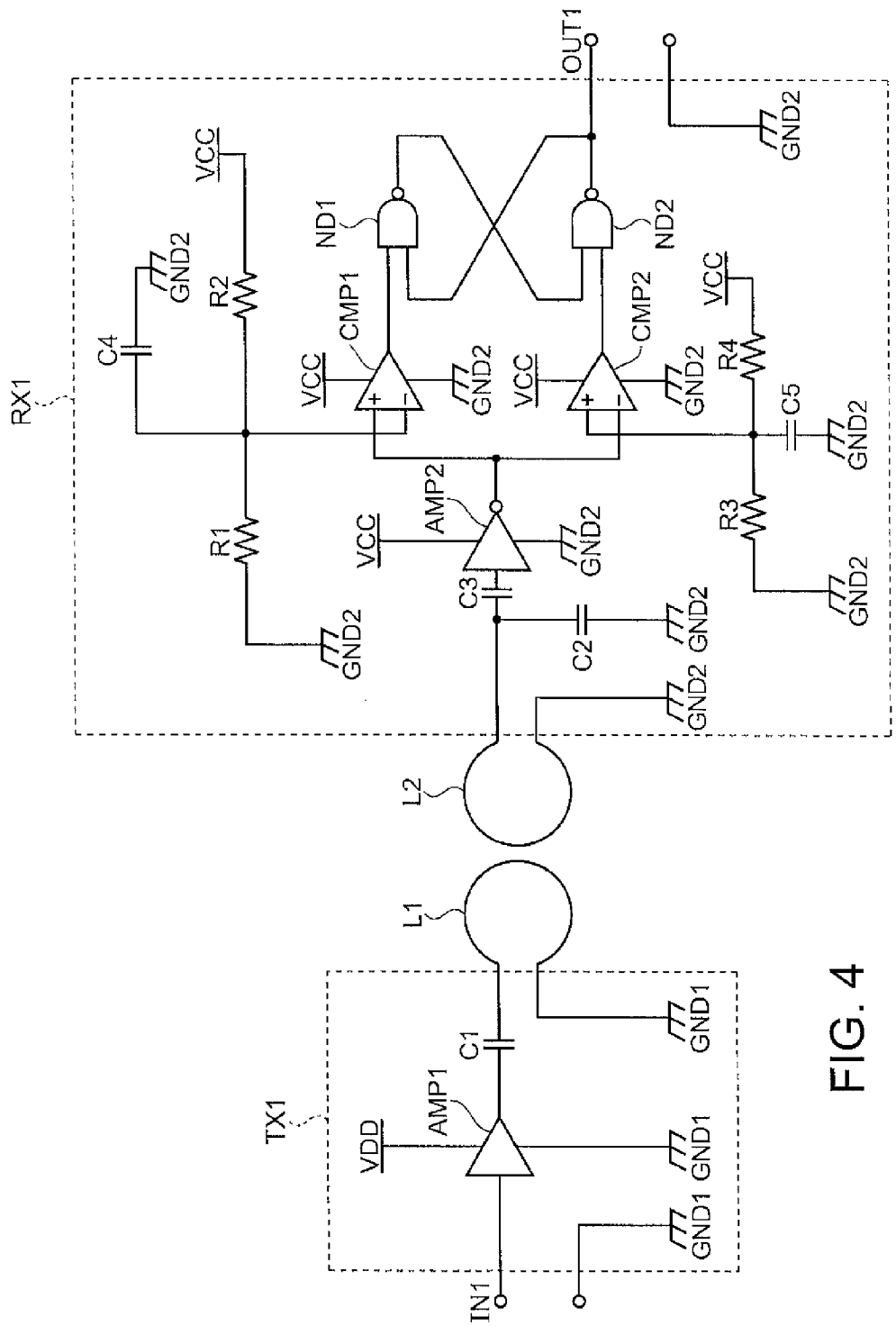
FIG. 4 shows circuit diagrams of a transmitter and a receiver.
Figure 5:
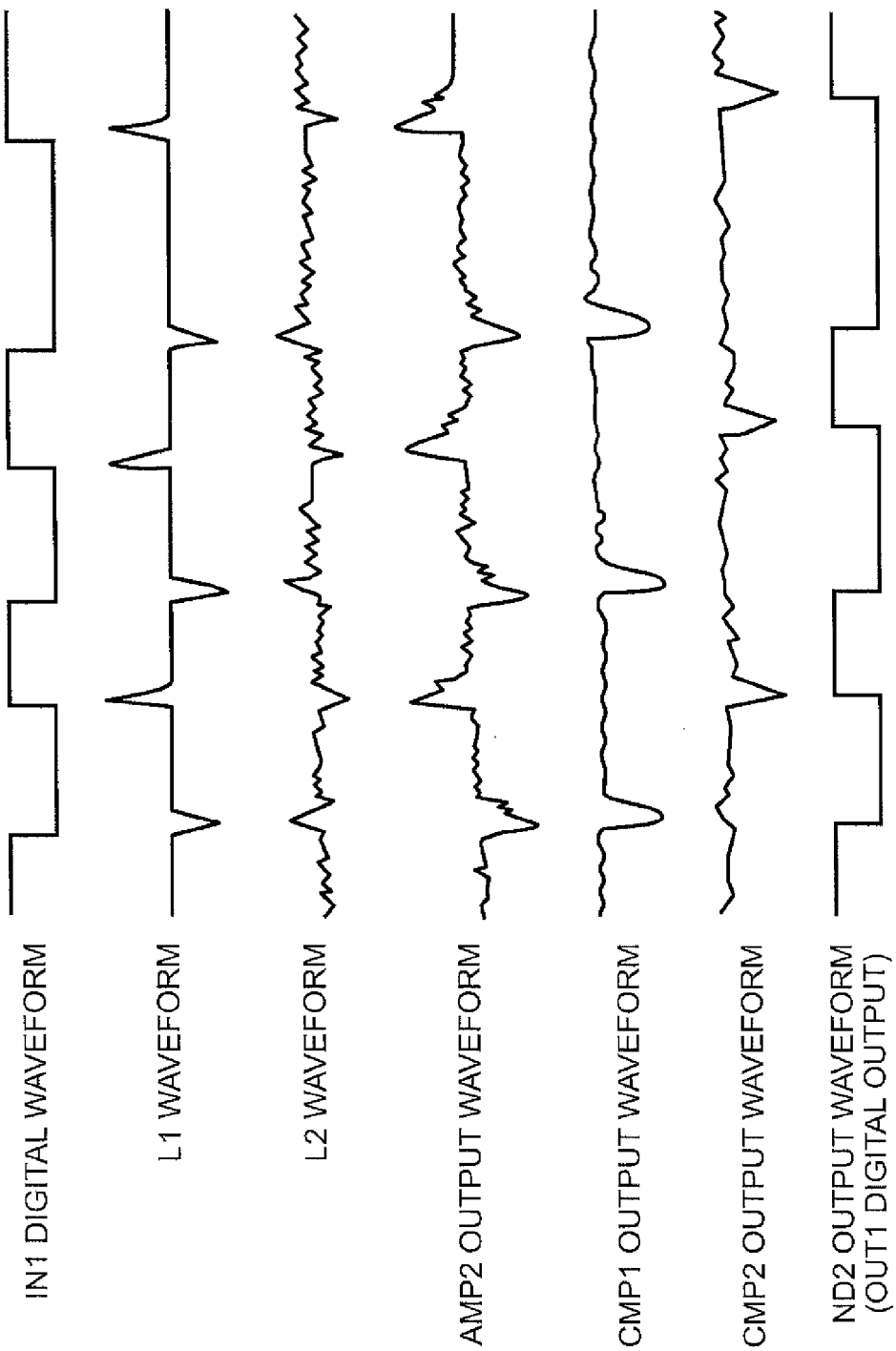
FIG. 5 shows waveforms outputted in the circuits of FIG. 4.

FIG. 4 shows diagrams of a circuit included in the transmitter 54 and a circuit included in the receiver 51. FIG. 5 shows waveforms outputted in the circuits of FIG. 4. The circuit surrounded by a dashed-line TX1 in FIG. 4 shows the circuit included in the transmitter 54 in FIG. 2. The circuit surrounded by a dashed-line RX1 in FIG. 4 shows the circuit included in the receiver 51 in FIG. 2.

To an input terminal IN1 in FIG. 4, a digital data signal shown by an IN1 digital waveform in FIG. 5 is inputted from the communication cable 55. The digital data signal is amplified by a driver amplifier AMP1 and supplied to a capacitor C1 and an inductance L1 formed by the coil 47 of FIG. 2. In a waveform of the inductance L1, a positive pulse signal is generated at a rising edge of the IN1 digital waveform and a negative pulse signal is generated at a falling edge as shown by an L1 waveform in FIG. 5.

In an inductance L2 formed by the coil 45 of FIG. 2, a signal waveform shown by an L2 waveform in FIG. 5 is induced by electromagnetic induction coupling. The signal waveform shown by the L2 waveform is amplified by a driver amplifier AMP2 to be a signal waveform shown by an AMP2 output waveform in FIG. 5.

The amplified signal waveform is shaped and the pulse time width is secured by a comparator CMP1 and a comparator CMP2, then, a comparator CMP1 output waveform and a comparator CMP2 output waveform in FIG. 5 are generated.

The pulse signals shown by the comparator 1 output waveform and the comparator 2 output waveform are restored to a digital signal in a flip-flop circuit including a NAND circuit ND1 and a NAND circuit ND2, and a digital data signal is transmitted from an output terminal OUT1 to the communication cable 50.

When a pulse signal is inputted to the coil 47, or when a pulse signal is induced in the coil 45 by electromagnetic induction coupling, magnetic flux flows in the magnetic bodies 44, 46, as shown, for example, by bold-solid line arrows of FIG. 2. Accordingly, it is possible to suppress magnetic flux leaking outside the magnetic bodies 44, 46. Therefore, even when the communication cable formed by the lead wire passes in the vicinity of the rotation axis S1, effects by magnetic flux can be reduced.

It is possible to transmit signals whose frequencies are several GHz to several dozen KHz by using the communication unit explained in the first embodiment.

In the present embodiment, the coil 47, the magnetic body 46 and the lead wire with insulating film 53 are a first ring-shaped coil, a first ring-shaped magnetic body and a first terminal respectively, and the coil 47, the magnetic body 46 and the lead wire with insulating film 53 form a transmitting portion. The coil 45, the magnetic body 44 and the lead wire with insulating film 52 are a second ring-shaped coil, a second ring-shaped magnetic body and a second terminal respectively, and the coil 45, the magnetic body 44 and the lead wire with insulating film 52 form a receiving portion. The transmitting portion and the receiving portion form the communication unit.

The rotating device 300 explained in the first embodiment includes the communication unit having the transmitting portion including the coil 47, the magnetic body 46 covering the coil 47 and the lead wire with insulating film 53 connected to the coil 47 and the receiving portion including the coil 45, the magnetic body 44 covering the coil 45 and the lead wire with insulating film 52 connected to the coil 45, and the bearing 41 connecting the hollow fixed member 40 to the hollow rotating member 42, which is capable of rotating with respect to the fixed member 40, in which the coil 47 and the coil 45 are formed so as to be wound around the rotation axis S1 of the bearing 41, the magnetic body 46 and the magnetic body 44 face each other with a gap G formed in the direction of the rotation axis S1, and the communication unit is provided inside the fixed member 40 and the rotating member 42.

According to the configuration, the magnetic body 46 covering the coil 47 and the magnetic body 44 covering the coil 45 face each other with the gap G formed in the direction of the rotation axis S1. Therefore, if the rotating member 42 rotates with respect to the fixed member 40, communication is possible. In addition, the communication unit is provided inside the fixed member 40 and the rotating member 42. Accordingly, communication cables to be connected to the transmitting portion and the receiving portion included in the communication unit can pass through the inside of the fixed member 40 and the rotating member 42 which are hollow.

Moreover, the coils 47, 45 and the magnetic bodies 46, 44 have a ring shape around the rotation axis S1. Since cables or flexible pipes different from the above communication cables can pass through the side of the rotation axis S1 for them having a ring shape, they can pass through the inside of the fixed member 40 and the rotating member 42.

The gap G in the direction of the rotation axis S1 is provided in the vicinity of the bearing 41.

According to this, when the rotating member 42 rotates with respect to the fixed member 40, misalignment between surfaces on which the magnetic body 46 and the magnetic body 44 respectively rotate and a surface orthogonal to the rotation axis S1 can be suppressed, therefore, the distance of the gap G to be changed can be reduced. Accordingly, it is possible to suppress damage caused by contact between the magnetic body 46 and the magnetic body 44 as well as suppress instability in communication between the lead wire with insulating film 53 and the lead wire with insulating film 52.

The magnetic body 46 covers the coil 47, which is the opposite side of the coil 45, and the magnetic body 44 covers the coil 45, which is the opposite side of the coil 47.

Accordingly, magnetic flux generated by the coils 47, 45 flows in the magnetic bodies 46, 44, therefore, it is possible to suppress instability in communication between the lead wire with insulating film 53 and the lead wire with insulating film 52.

Second Embodiment

Figure 6:
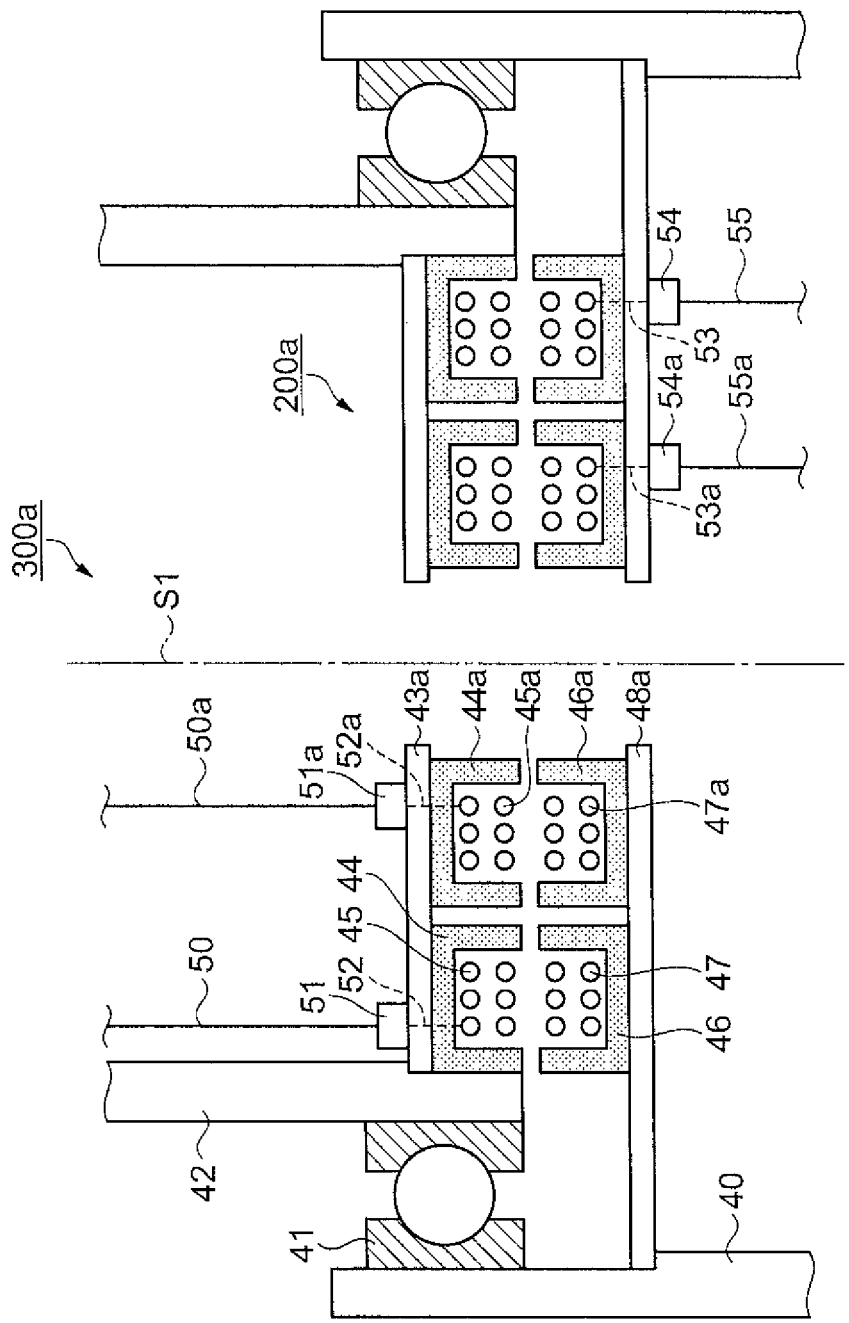
FIG. 6 is a cross-sectional view of a rotating device including a communication unit having two pairs of electromagnetic induction coupling portions according to a second embodiment.

In a second embodiment, communication transmitted from the fixed side to the rotating side by using two electromagnetic induction coupling portions and, conversely, communication transmitted from the rotating side to the fixed side will be explained. FIG. 6 is a cross-sectional view of a rotating device 300a including a communication unit 200a having two pairs of electromagnetic induction coupling portions.

The communication unit 200a of FIG. 6 additionally includes a pair of coils 47a, 45a and a pair of magnetic bodies 46a, 44a inside a pair of coils 47, 45 and a pair of magnetic bodies 46, 44 explained in FIG. 2.

The magnetic bodies 44, 44a including the coils 45, 45a and the magnetic bodies 46, 46a including the coils 47, 47a are supported by supporting members 43a, 48a, respectively.

A control signal outputted from the controller 20 is transmitted from the fixed side to the rotating side. The signal is transmitted from the communication cable 55 to the communication cable 50 by the electromagnetic induction coupling portion including a pair of coils 45, 47 and a pair of magnetic bodies 44, 46, the transmitter 54 and the receiver 51. That is, the control signal outputted from the controller 20 of FIG. 1 is transmitted to the communication cable 50 through the communication cable 55, the transmitter 54, the lead wire with insulating film 53 which pierces through the supporting member 48a and the magnetic body 46, the coil 47, the coil 45, the lead wire with insulating film 52 as the second terminal, which pierces through the supporting member 43a and the magnetic body 44 and the receiver 51.

On the other hand, a detection signal is transmitted from a detecting portion (not shown) provided at the rotating side to the fixed side. The detection signal is transmitted from a communication cable 50a to a communication cable 55a by the electromagnetic induction coupling portion including a pair of coils 45a, 47a and a pair of magnetic bodies 44a, 46a, a transmitter 51a and a receiver 54a. That is, the detection signal transmitted from the rotating side is transmitted to the communication cable 55a through the communication cable 50a, the transmitter 51a, a lead wire with insulating film 52a which pierces through the supporting member 43a and the magnetic body 44a, the coil 45a, the coil 47a, a lead wire with insulating film 53a which pierces through the supporting member 48a and the magnetic body 46a, and the receiver 54a.

In the present embodiment, the coil 47, the magnetic body 46 and the lead wire with insulating film 53 are a first ring-shaped coil, a first ring-shaped magnetic body and a first terminal respectively, and the coil 47, the magnetic body 46, the lead wire with insulating film 53 form a transmitting portion. The coil 45, the magnetic body 44 and the lead wire with insulating film 52 are a second ring-shaped coil, a second ring-shaped magnetic body and a second terminal respectively, and the coil 45, the magnetic body 44 and the lead wire with insulating film 52 form a receiving portion. The transmitting portion and the receiving portion form the communication unit.

Additionally, the coil 45a, the magnetic body 44a and the lead wire with insulating film 52a are a first ring-shaped coil, a first ring-shaped magnetic body and a first terminal respectively, and the coil 45a, the magnetic body 44a, the lead wire with insulating film 52a form a transmitting portion. The coil 47a, the magnetic body 46a and the lead wire with insulating film 53a are a second ring-shaped coil, a second ring-shaped magnetic body and a second terminal respectively, and the coil 47a, the magnetic body 46a and the lead wire with insulating film 53a form a receiving portion. The transmitting portion and the receiving portion form the communication unit.

The rotating device 300a including the communication unit 200a explained in the second embodiment includes plural electromagnetic induction coupling portions, in which the central axis of a pair of coils 45, 47 and a pair of coils 45a, 47a included in respective electromagnetic induction coupling portions is at the position of the rotation axis S1.

According to the configuration, the signal transmitted from the fixed side to the rotating side and the signal transmitted from the rotating side to the fixed side are processed in parallel, therefore, processing speed can be improved.

Additionally, the magnetic bodies 44, 46 cover the inside of the coils 45, 47, namely, the side of the rotation axis S1. According to this, magnetic flux leaking inside a pair of coils 45, 47 can be reduced, therefore, the electromagnetic induction coupling portion including a pair of coils 45a, 47a and a pair of magnetic bodies 44a, 46a can be provided inside a pair of coils 45, 47.

Additionally, the magnetic bodies 44a, 46a cover the outside of the coils 45a, 47a, namely, the opposite side of the rotation axis S1. According to this, magnetic flux leaking outside a pair of coils 45a, 47a can be reduced, therefore, the electromagnetic induction coupling portion including a pair of coils 45, 47 and a pair of magnetic bodies 44, 46 can be provided outside a pair of coils 45a, 47a.

Third Embodiment

In a third embodiment, a communication unit including magnetic bodies whose cross-sectional shape covering the inside of the coil is an L-shape will be explained.

Figure 7:
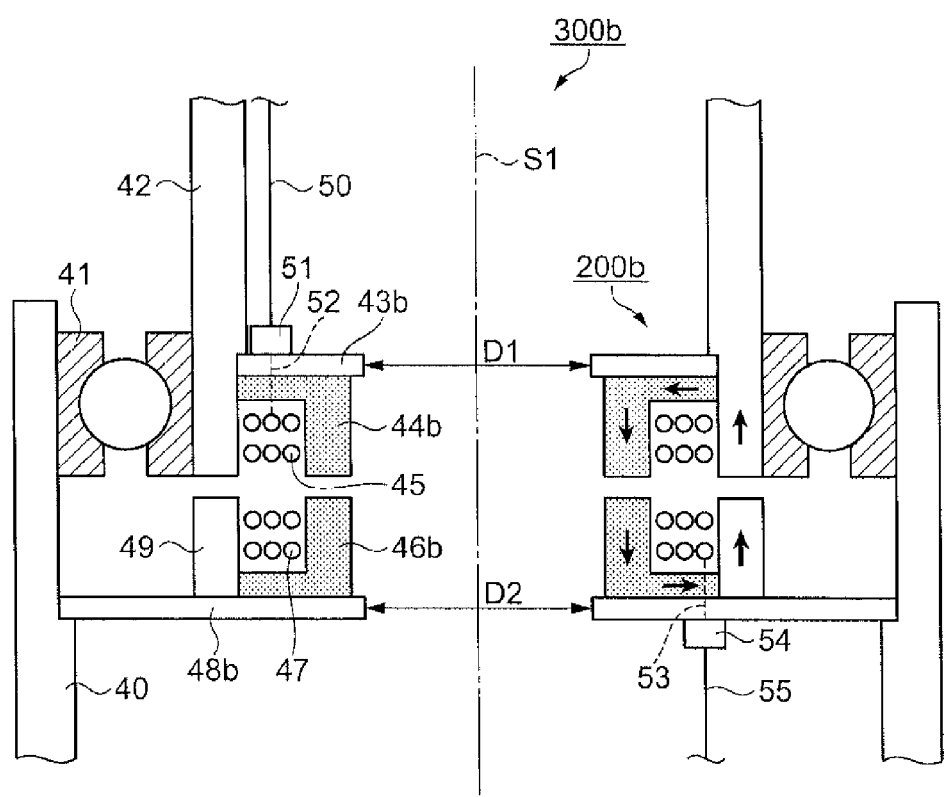
FIG. 7 is a cross-sectional view of a rotating device including a communication unit having magnetic bodies whose cross-sectional shape is an L-shape according to a third embodiment.

FIG. 7 is a cross-sectional view of a rotating device 300b including a communication unit 200b having magnetic bodies whose cross-sectional shape is an L-shape. In FIG. 7, a pair of magnetic bodies 44, 46 and the supporting members 43, 48 which support them explained in the first embodiment of FIG. 2 are replaced with a pair of magnetic bodies 46b, 44b and supporting members 48b, 43b which support them. As shown in FIG. 7, the cross-sectional shape of a pair of magnetic bodies 46b, 44b is an L-shape, covering the inside of the coil 47 and the coil 45.

The coil 47 and the magnetic body 46b are fixed by a supporting member 49. When a pulse signal is inputted in the coil 47 or when a pulse signal is induced in the coil 45 by electromagnetic induction coupling, magnetic flux flows in the magnetic bodies 44b, 46b, the rotating member 42 and the supporting member 49 in a direction, for example, shown by bold-solid line arrows.

According to the above, magnetic flux generated by the coil 45 and the coil 47 respectively flows in the magnetic body 44b and the magnetic body 46b respectively by providing the magnetic bodies 44b, 46b covering the inside of the coils 45, 47, therefore, it is possible to suppress instability in communication between the lead wire with insulating film 53 and the lead wire with insulating film 52.

It is also possible to make the length of an inside diameter D1 of the supporting member 43b and the length of an inside diameter D2 of the supporting member 48b to be longer by providing the magnetic bodies 44b, 46b which cover the inside of the coils 45, 47. Therefore, a large spatial area passing through the rotation axis S1 can be secured.

In the present embodiment, the coil 47, the magnetic body 46b and the lead wire with insulating film 53 are a first ring-shaped coil, a first ring-shaped magnetic body and a first terminal respectively, and the coil 47, the magnetic body 46b and the lead wire with insulating film 53 form a transmitting portion. The coil 45, the magnetic body 44b and the lead wire with insulating film 52 are a second ring-shaped coil, a second ring-shaped magnetic body and a second terminal respectively, and the coil 45, the magnetic body 44b and the lead wire with insulating film 52 form a receiving portion. The transmitting portion and the receiving portion form the communication unit.

Fourth Embodiment

Figure 8:
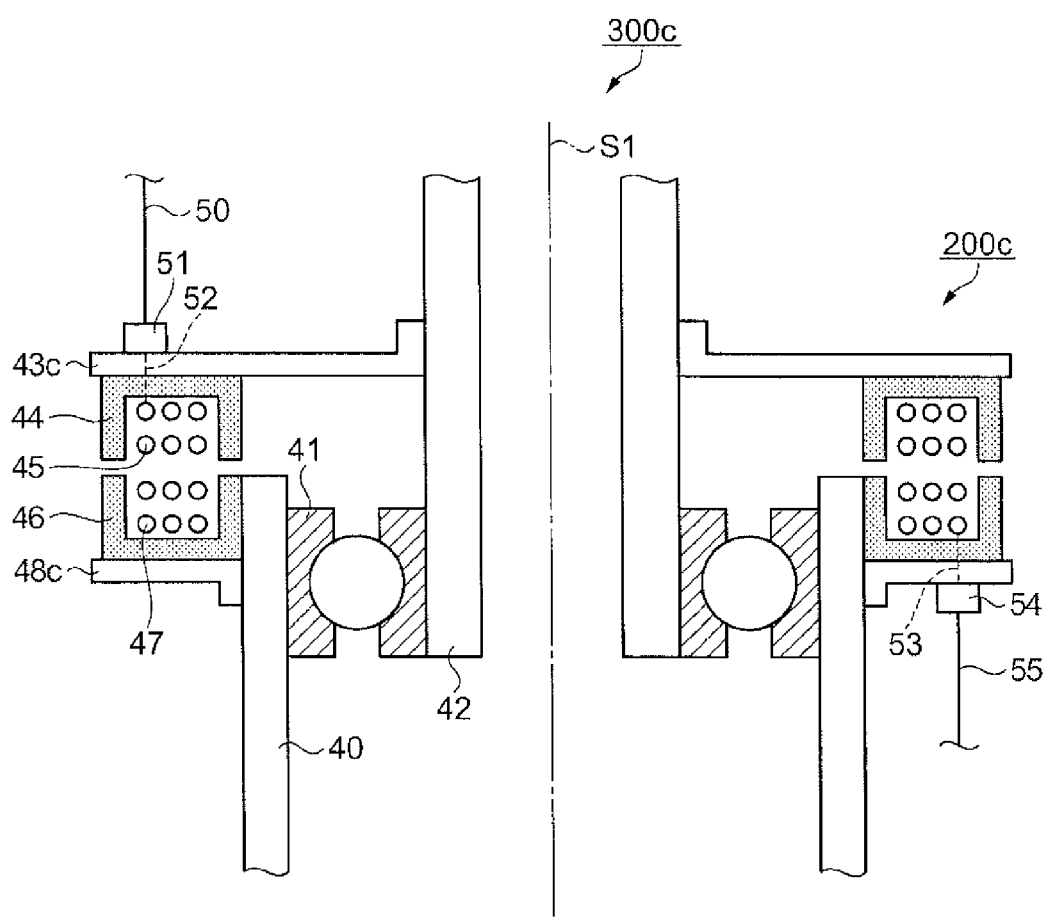
FIG. 8 is a cross-sectional view of a rotating device including a bearing inside a pair of coils according to a fourth embodiment.

In a fourth embodiment, a rotating device 300c including the bearing 41 inside a pair of coils 45, 47 included in a communication unit 200c will be explained. FIG. 8 is a cross-sectional view of the rotating device 300c including the bearing 41 inside a pair of coils 45, 47.

The magnetic body 44 including the coil 45 is supported by a supporting member 43c which is fixed to the rotating member 42. The magnetic body 46 including the coil 47 is supported by a supporting member 48c which is fixed to the fixed member 40.

The coil 47 is electrically connected to the transmitter 54 through the lead wire with insulating film 53 which pierces through the supporting member 48c and the magnetic body 46. The coil 45 is electrically connected to the receiver 51 through the lead wire with insulating film 52 which pierces through the supporting member 43c and the magnetic body 44.

A pulse signal inputted from the communication cable 55 is transmitted to the communication cable 50 by the transmitter 54, the coils 45, 47 and the receiver 51.

According to the above, cables and flexible pipes can be passed through a hollow portion in the rotating member 42.

Fifth Embodiment

In a fifth embodiment, the gap between the first ring-shaped magnetic body and the second ring-shaped magnetic body is positioned at a point in which the gap is aligned with the bearing in the direction of the rotation axis.

Figure 11:
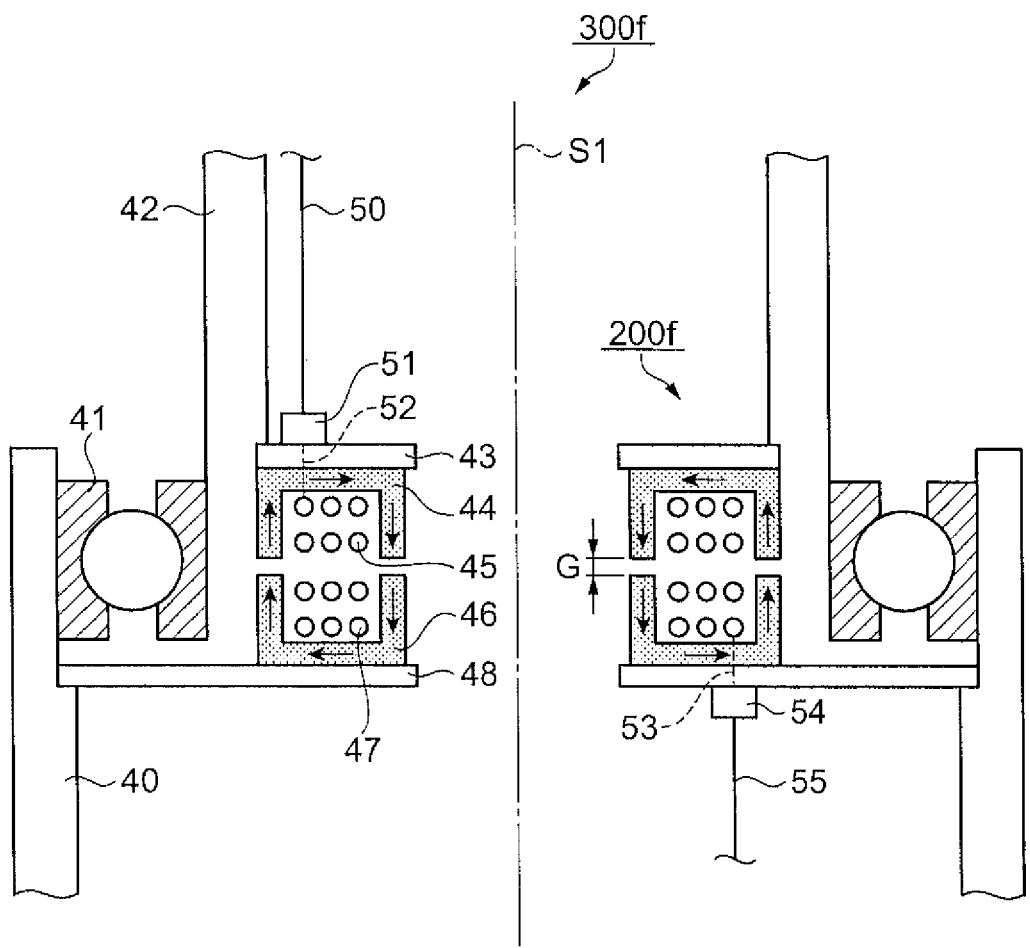
FIG. 11 a cross-sectional view of a rotating device according to a fifth embodiment.

FIG. 11 is a cross-sectional view of a rotating device 300f according to the present embodiment. FIG. 11 is a view showing that the magnetic bodies 46, 44 are provided so that the gap G in the rotating device 300 of FIG. 2 explained in the first embodiment is aligned with the bearing 41 in the direction of the rotation axis S1.

According to this, when the rotating member 42 rotates with respect to the fixed member 40, misalignment between surfaces on which the magnetic body 46 and the magnetic body 44 respectively rotate and a surface orthogonal to the rotation axis S1 can be further suppressed, therefore, the distance of the gap G to be changed can be further reduced. Accordingly, it is possible to suppress damage caused by contact between the magnetic body 46 and the magnetic body 44 as well as suppress instability in the communication between the lead wire with insulating film 53 and the lead wire with insulating film 52.

In the present embodiment, the coil 47, the magnetic body 46 and the lead wire with the insulting film 53 are a first ring-shaped coil, a first ring-shaped magnetic body and a first terminal respectively, and the coil 47, the magnetic body 46 and the lead wire with the insulting film 53 form a transmitting portion. The coil 45, the magnetic body 44 and the lead wire with the insulting film 52 are a second ring-shaped coil, a second ring-shaped magnetic body and a second terminal respectively, and the coil 45, the magnetic body 44 and the lead wire with the insulting film 52 form a receiving unit. The transmitting portion and the receiving portion form the communication unit.

First Modification Example

A case in which, in a rotating device according to a first modification example, two pairs of electromagnetic induction coupling portions are provided, and a signal is transmitted by a communication unit formed by one pair of the electromagnetic induction coupling portions and power is supplied by the other pair of the electromagnetic induction coupling portions will be explained.

Figure 9:
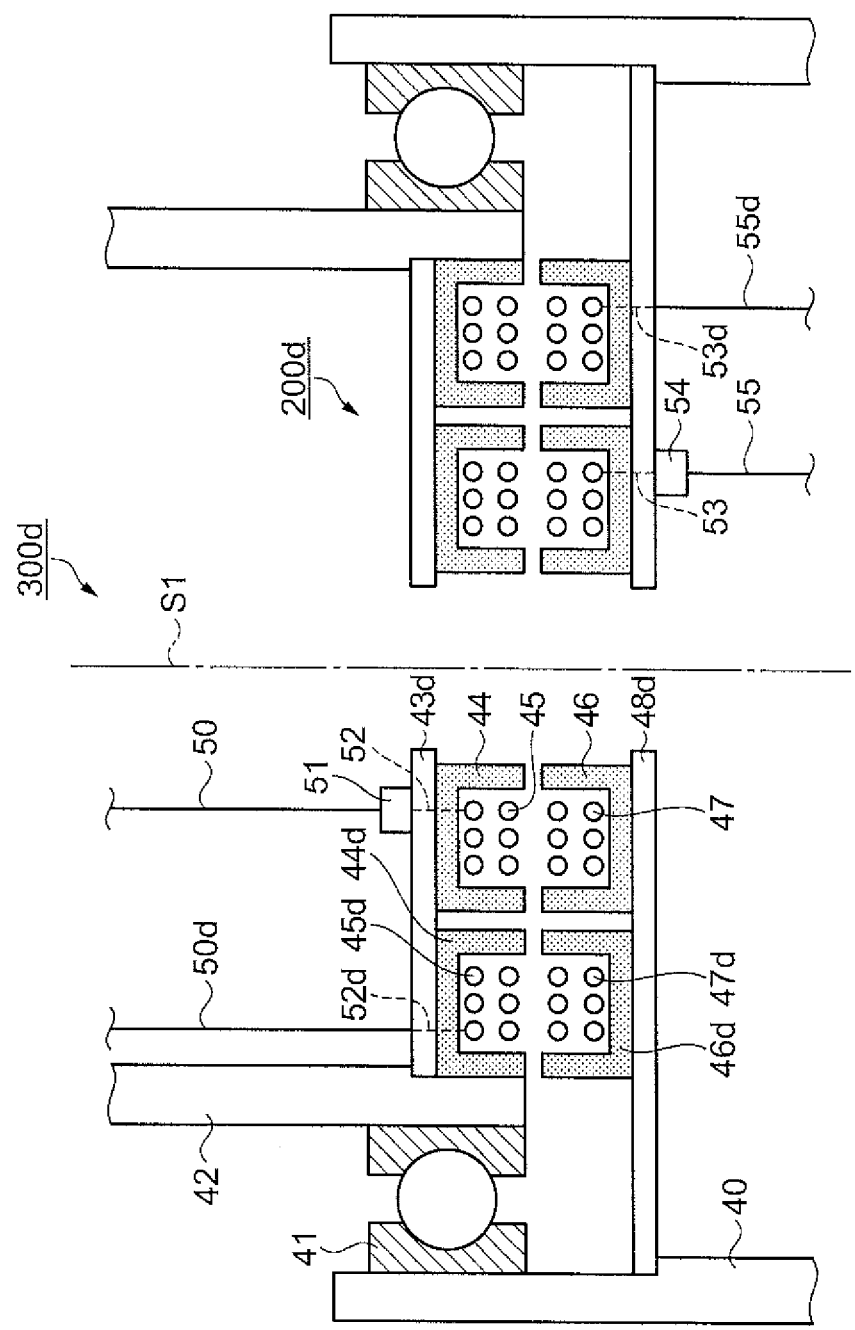
FIG. 9 is a cross-sectional view of a rotating device according to a first modification example.

FIG. 9 is a cross-sectional view of a rotating device 300d according to the first modification example. An AC power cable 55d in FIG. 9 is electrically connected to a coil 47d through a lead wire with insulating film 53d which pierces through a supporting member 48d and a magnetic body 46d. An AC power cable 50d is electrically connected to a coil 45d through a lead wire with insulating film 52d which pierces through a supporting member 43d and a magnetic body 44d. The coils 45d, 47d are covered by the magnetic bodies 44d, 46d, respectively. Power supplied to the AC power cable 55d is supplied to the AC power cable 50d by electromagnetic induction coupling.

A pair of coils 45, 47 is provided inside a pair of coils 45d, 47d, which is covered by the magnetic bodies 44, 46, respectively. A digital data signal inputted from the communication cable 55 is transmitted to the communication cable 50 by a pair of coils 45, 47, the transmitter 54 connected through the lead wire with insulating film 53 which pierces through the supporting member 48d and the magnetic body 46, and the receiver 51 connected through the lead wire with insulating film 52 which pierces through the supporting member 43d and the magnetic body 44.

The coils 45d, 47d which supply power are provided outside the coils 45, 47, thereby reducing the winding number of coils.

According to this, the rotating device 300d according to the first modification example is capable of transmitting power or signals in a non-contact manner. It is also possible to secure a spatial area passing in the vicinity of the rotation axis S1 and to provide cables and flexible pipes passing in the vicinity of the rotation axis S1.

In the present embodiment, the coil 47, the magnetic body 46 and the lead wire with insulating film 53 are a first ring-shaped coil, a first ring-shaped magnetic body and a first terminal respectively and the coil 47, the magnetic body 46 and the lead wire with insulating film 53 form a transmitting portion. The coil 45, the magnetic body 44 and the lead wire with insulating film 52 are a second ring-shaped coil, a second ring-shaped magnetic body and a second terminal respectively, and the coil 45, the magnetic body 44 and the lead wire with insulating film 52 form a receiving portion. The transmitting portion and the receiving portion form the communication unit.

Second Modification Example

In a second modification example, a rotating device including an electromagnetic induction coupling portion supplying power by allowing side surfaces of coils to face each other.

Figure 10:
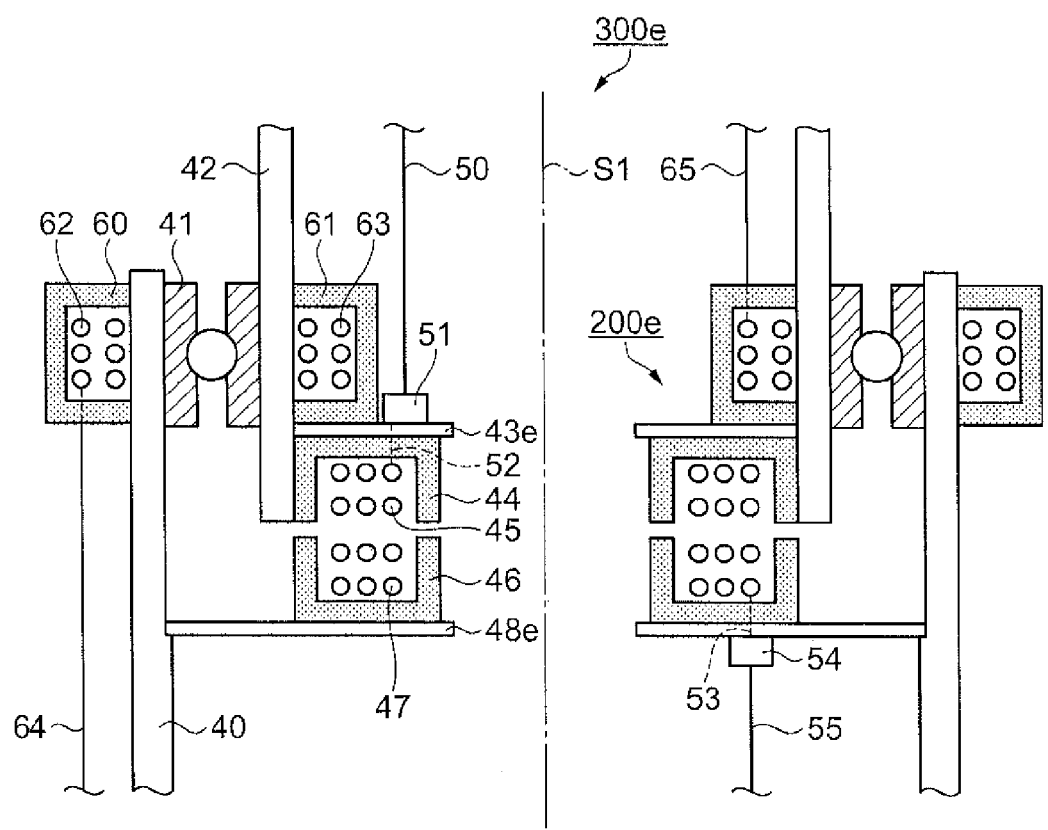
FIG. 10 is a cross-sectional view of a rotating device including an electromagnetic induction coupling portion which supplies power by allowing side surfaces of coils to face each other according to a second modification example.

FIG. 10 is a cross-sectional view of a rotating device 300e including the electromagnetic induction coupling portion supplying power by allowing side surfaces of coils 62, 63 to face each other. Coils 62, 63 are formed by winding lead wires with respect to the rotation axis S1. A diameter of the coil 63 is shorter than a diameter of the coil 62.

A magnetic body 60 including the coil 62 is supported at the outer periphery of the fixed member 40, and a magnetic body 61 including the coil 63 is supported at the inner periphery of the rotating member 42. As shown in FIG. 10, an inner peripheral side surface of the coil 62 faces an outer peripheral side surface of the coil 63 so as to sandwich the bearing 41.

Power applied from a power cable 64 is supplied to a power cable 65 by electromagnetic induction coupling by the coils 62, 63.

The magnetic bodies 46, 44 including a pair of coils 47, 45 formed by lead wires wound with respect to one rotation axis S1 are supported by supporting members 43e, 48e, respectively.

A pulse signal inputted from the communication cable 55 is transmitted to the communication cable 50 by a pair of coils 45, 47, the transmitter 54 connected through the lead wire with insulating film 53 which pierces through the supporting member 48e and the magnetic body 46, and the receiver 51 connected through the lead wire with insulating film 52 which pierces through the supporting member 43e and the magnetic body 44.

A communication unit 200e according to the second modification example includes a pair of coils 45, 47, a pair of supporting members 43e, 48e, the transmitter 54, the receiver 51 and the lead wires with insulating film 52, 53.

According to the above, it is possible to supply power as well as transmit signals in a non-contact manner in the rotating device 300e including the rotating portion which rotates with respect to the fixed portion. Additionally, a spatial area passing in the vicinity of the rotation axis S1 can be secured, therefore, cables and flexible pipes passing in the vicinity of the rotation axis S1 can be provided.

In the present embodiment, the coil 47, the magnetic body 46 and the lead wire with insulating film 53 are a first ring-shaped coil, a first ring-shaped magnetic body and a first terminal, and the coil 47, the magnetic body 46 and the lead wire with insulating film 53 form a transmitting portion. The coil 45, the magnetic body 44 and the lead wire with insulating film 52 are a second ring-shaped coil, a second ring-shaped magnetic body and a second terminal, and the coil 45, the magnetic body 44 and the lead wire with insulating film 52 form a receiving portion. The transmitting portion and the receiving portion form the communication unit.

As described above, in the first embodiment to the fifth embodiment, the first modification example and the second modification example, the rotating device using the communication unit transmitting signals in a non-contact manner, which is included in the robot arm 100 has been explained, however, the invention can be applied to a rotating device including a rotating portion which rotates with respect to a fixed portion, not limited to the robot arm.

The entire disclosure of Japanese Patent Application No. 2008-325104, filed Dec. 22, 2008 is expressly incorporated by reference herein.

What is claimed is:

1. A rotating device comprising:
a power supply unit including a transmitting portion having a first ring-shaped coil, a first ring-shaped magnetic body covering the first ring-shaped coil and a first terminal connected to the first ring-shaped coil, and a receiving portion having a second ring-shaped coil, a second ring-shaped magnetic body covering the second ring-shaped coil and a second terminal connected to the second ring-shaped coil;
a first power supply cable connected to the transmitting portion and a second power supply cable connected to the receiving portion; and
a bearing connecting a hollow fixed portion to a hollow rotating portion with a hole in a center of the hollow rotating portion, wherein:
the hollow rotating portion is capable of rotating with respect to the hollow fixed portion,
the first ring-shaped coil and the second ring-shaped coil are formed so as to be wound around a rotation axis of the bearing,
the first ring-shaped magnetic body and the second ring-shaped magnetic body face each other with a gap formed in the direction of the rotation axis,
the power supply unit is provided inside the hollow fixed portion and inside the hole of the hollow rotating portion,
the first power supply cable and the second power supply cable pass inside the hollow fixed portion and inside the hole of the hollow rotating portion, and
the power supply unit is closer to the rotation axis than the bearing.

2. The rotating device according to claim 1, wherein the gap in the direction of the rotation axis is provided in the vicinity of the bearing.

3. The rotating device according to claim 2, wherein the gap in the direction of the rotation axis is provided so as to be aligned with the bearing.

4. The rotating device according to claim 1, wherein the first ring-shaped magnetic body covers the first ring-shaped coil, which is the opposite side of the second ring-shaped coil, and the second ring-shaped magnetic body covers the second ring-shaped coil, which is the opposite side of the first ring-shaped coil.

5. The rotating device according to claim 1, wherein the first ring-shaped magnetic body covers the side of the rotation axis of the first ring-shaped coil, and the second ring-shaped magnetic body covers the side of the rotation axis of the second ring-shaped coil.

6. The rotating device according to claim 1, wherein the first ring-shaped magnetic body covers the opposite side of the rotation axis of the first ring-shaped coil, and the second ring-shaped magnetic body covers the opposite side of the rotation axis of the second ring-shaped coil.

7. A robot arm device comprising:
the rotating device according to claim 1.

* * * * *